(12) United States Patent
Thomen et al.

(10) Patent No.: US 10,215,051 B2
(45) Date of Patent: Feb. 26, 2019

(54) GAS TURBINE ENGINE COMPONENT PROVIDING PRIORITIZED COOLING

(71) Applicant: UNITED TECHNOLOGIES CORPORATION, Farmington, CT (US)

(72) Inventors: Seth J. Thomen, Colchester, CT (US); Edward Pietraszkiewicz, Southington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 298 days.

(21) Appl. No.: 14/911,285

(22) PCT Filed: Aug. 13, 2014

(86) PCT No.: PCT/US2014/050864
§ 371 (c)(1),
(2) Date: Feb. 10, 2016

(87) PCT Pub. No.: WO2015/026598
PCT Pub. Date: Feb. 26, 2015

(65) Prior Publication Data
US 2016/0194980 A1    Jul. 7, 2016

Related U.S. Application Data

(60) Provisional application No. 61/867,777, filed on Aug. 20, 2013.

(51) Int. Cl.
*F01D 25/12*       (2006.01)
*F04D 29/54*       (2006.01)
(Continued)

(52) U.S. Cl.
CPC ............. *F01D 25/12* (2013.01); *F01D 9/041* (2013.01); *F01D 9/065* (2013.01); *F01D 11/08* (2013.01);
(Continued)

(58) Field of Classification Search
CPC ... F01D 9/065; F01D 9/02; F01D 9/04; F01D 11/10; F01D 11/02; F01D 11/04;
(Continued)

(56) References Cited

U.S. PATENT DOCUMENTS 4,712,979 A    12/1987  Finger
5,413,458 A     5/1995  Calderbank
(Continued)

FOREIGN PATENT DOCUMENTS

EP    2441920         4/2012
EP    2469034         6/2012
EP    2562365 A2      2/2013

OTHER PUBLICATIONS

The Extended European Search Report for EP Application No. 14837927.4, dated Apr. 6, 2017.
(Continued)

*Primary Examiner* — Richard Edgar
*Assistant Examiner* — Danielle M Christensen
(74) *Attorney, Agent, or Firm* — Carlson, Gaskey & Olds, P.C.

(57) ABSTRACT

A component for a gas turbine engine according to an exemplary aspect of the present disclosure includes, among other things, a platform having a non-gas path surface and a gas path surface, a cover plate positioned relative to the non-gas path surface and a cooling passage that extends between the cover plate and the non-gas path surface. At least one cooling entrance is formed through the cover plate
(Continued)

and configured to bias the flow of a cooling fluid toward a prioritized location of the non-gas path surface.

18 Claims, 4 Drawing Sheets

(51) Int. Cl.
| | |
|---|---|
| *F04D 29/58* | (2006.01) |
| *F01D 11/24* | (2006.01) |
| *F02C 7/12* | (2006.01) |
| *F01D 9/04* | (2006.01) |
| *F01D 11/08* | (2006.01) |
| *F04D 29/16* | (2006.01) |
| *F01D 9/06* | (2006.01) |

(52) U.S. Cl.
CPC ............... *F01D 11/24* (2013.01); *F02C 7/12* (2013.01); *F04D 29/164* (2013.01); *F04D 29/542* (2013.01); *F04D 29/582* (2013.01); *F04D 29/584* (2013.01); *F05D 2220/32* (2013.01); *F05D 2240/11* (2013.01); *F05D 2240/81* (2013.01); *F05D 2250/11* (2013.01); *F05D 2260/201* (2013.01); *F05D 2260/202* (2013.01); *F05D 2260/205* (2013.01); *F05D 2260/22141* (2013.01)

(58) Field of Classification Search
CPC ........ F01D 11/12; F01D 11/24; F01D 25/246; F01D 25/24; F01D 25/00; F05D 2240/11; F05D 2240/24; F05D 2240/81; F05D 2250/11; F05D 2260/202; F05D 2260/22141; F05D 2260/201; F05D 2260/52; F02C 7/12

See application file for complete search history.

(56) References Cited

U.S. PATENT DOCUMENTS

| | | | |
|---|---|---|---|
| 6,508,620 B2 | 1/2003 | Sreekanth et al. | |
| 7,604,456 B2 | 10/2009 | Schiavo, Jr. et al. | |
| 7,625,172 B2 | 12/2009 | Walz et al. | |
| 7,670,108 B2 * | 3/2010 | Liang | F01D 11/005 |
| | | | 415/115 |
| 8,016,546 B2 | 9/2011 | Surace et al. | |
| 8,251,652 B2 | 8/2012 | Campbell et al. | |
| 2004/0076520 A1 | 4/2004 | Dellmann et al. | |
| 2005/0249584 A1 * | 11/2005 | Amiot | F01D 9/04 |
| | | | 415/115 |
| 2008/0190114 A1 | 8/2008 | Surace et al. | |
| 2009/0028692 A1 | 1/2009 | Surace et al. | |
| 2011/0229305 A1 * | 9/2011 | Bergman | F01D 9/041 |
| | | | 415/115 |

OTHER PUBLICATIONS

International Search Report and Written Opinion of the International Searching Authority for International application No. PCT/US2014/050864 dated Nov. 20, 2014.

International Preliminary Report on Patentability for PCT Application No. PCT/US2014/050864, dated Mar. 3, 2016.

* cited by examiner

GAS TURBINE ENGINE COMPONENT PROVIDING PRIORITIZED COOLING

BACKGROUND

This disclosure relates generally to a cooled gas turbine engine component. More particularly, this disclosure is directed to a gas turbine engine component capable of providing prioritized cooling at preferred locations (i.e., relatively hotter surfaces) of the component prior to cooling less preferred locations (i.e., relatively cooler surfaces) of the component.

Gas turbine engines typically include a compressor section, a combustor section, and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections of a gas turbine engine may include alternating rows of rotating blades and stationary vanes that extend into the core flow path of the gas turbine engine. For example, in the turbine section, turbine blades rotate to extract energy from the hot combustion gases. The turbine vanes direct the combustion gases at a preferred angle of entry into the downstream row of blades. Blades and vanes are examples of components that may need cooled by a dedicated source of cooling air in order to withstand the relatively high temperatures of the hot combustion gases they are exposed to.

SUMMARY

A component for a gas turbine engine according to an exemplary aspect of the present disclosure includes, among other things, a platform having a non-gas path surface and a gas path surface, a cover plate positioned relative to the non-gas path surface and a cooling passage that extends between the cover plate and the non-gas path surface. At least one cooling entrance is formed through the cover plate and configured to bias the flow of a cooling fluid toward a prioritized location of the non-gas path surface.

In a further non-limiting embodiment of the foregoing component, the platform is an outer diameter platform or an inner diameter platform.

In a further non-limiting embodiment of either of the foregoing components, the cover plate is a separate component from the platform.

In a further non-limiting embodiment of any of the foregoing components, the component is static hardware of the gas turbine engine.

In a further non-limiting embodiment of any of the foregoing components, an airfoil extends from the gas path side of the platform.

In a further non-limiting embodiment of any of the foregoing components, the cover plate is received at least partially about an opening of an internal core of the airfoil.

In a further non-limiting embodiment of any of the foregoing components, the at least one cooling entrance is positioned exclusively at a first location of the cover plate and the cover plate excludes cooling openings outside of the first location.

In a further non-limiting embodiment of any of the foregoing components, a plurality of cooling entrances are positioned near a leading edge of the cover plate.

In a further non-limiting embodiment of any of the foregoing components, the plurality of cooling entrances are triangular shaped.

In a further non-limiting embodiment of any of the foregoing components, the prioritized location is at a leading edge of the platform.

A gas turbine engine according to an exemplary aspect of the present disclosure includes, among other things, a compressor section and a turbine section downstream from the compressor section. A component is positioned within at least one of the compressor section and the turbine section. The component includes a platform having a non-gas path surface and a gas path surface. A cover plate is positioned adjacent to the non-gas path surface and a cooling passage extends between the cover plate and the non-gas path surface. A plurality of cooling entrances are positioned exclusively at a first location of the cover plate. The cover plate excludes cooling openings outside of the first location.

In a further non-limiting embodiment of the foregoing gas turbine engine, the component is a vane.

In a further non-limiting embodiment of either of the foregoing gas turbine engines, the component is a blade outer air seal (BOAS).

In a further non-limiting embodiment of any of the gas turbine engines, the plurality of cooling entrances are configured to bias the flow of a cooling fluid toward a prioritized location of the non-gas path surface.

In a further non-limiting embodiment of any of the gas turbine engines, at least one opening is configured to expel a cooling fluid from the cooling passage to either a core flow path of the gas turbine engine or a second cooling passage.

A method of cooling a component of a gas turbine engine according to another exemplary aspect of the present disclosure includes, among other things, communicating a cooling fluid through at least one cooling entrance of a cover plate and into a first cooling passage and cooling a prioritized location of a platform with the cooling fluid. After the step of cooling, the cooling fluid is communicated to a non-prioritized location of the platform and expelled from the cooling passage.

In a further non-limiting embodiment of the foregoing method, the step of communicating the cooling fluid through the at least one cooling entrance includes altering a flow characteristic of the cooling fluid.

In a further non-limiting embodiment of either of the foregoing methods, the step of communicating the cooling fluid to the non-prioritized location includes circulating the cooling fluid to convectively cool the non-prioritized location.

In a further non-limiting embodiment of any of the foregoing methods, the step of expelling includes communicating the cooling fluid to a core flow path of the gas turbine engine.

In a further non-limiting embodiment of any of the foregoing methods, the step of expelling includes communicating the cooling fluid to a second cooling passage.

The embodiments, examples and alternatives of the preceding paragraphs, the claims, or the following descriptions and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a gas turbine engine component that prioritizes cooling at specific locations of the component. For example, the gas turbine engine components described by this disclosure may employ a cover plate having a plurality of cooling entrances for directing a cooling fluid to preferred locations of a platform. The shape and location of the cooling entrances may be configured such that the cooling fluid is supplied first to the relatively hotter surfaces of the component before passing over its relatively cooler surfaces. These and other features are described in detail herein.

Figure 1:
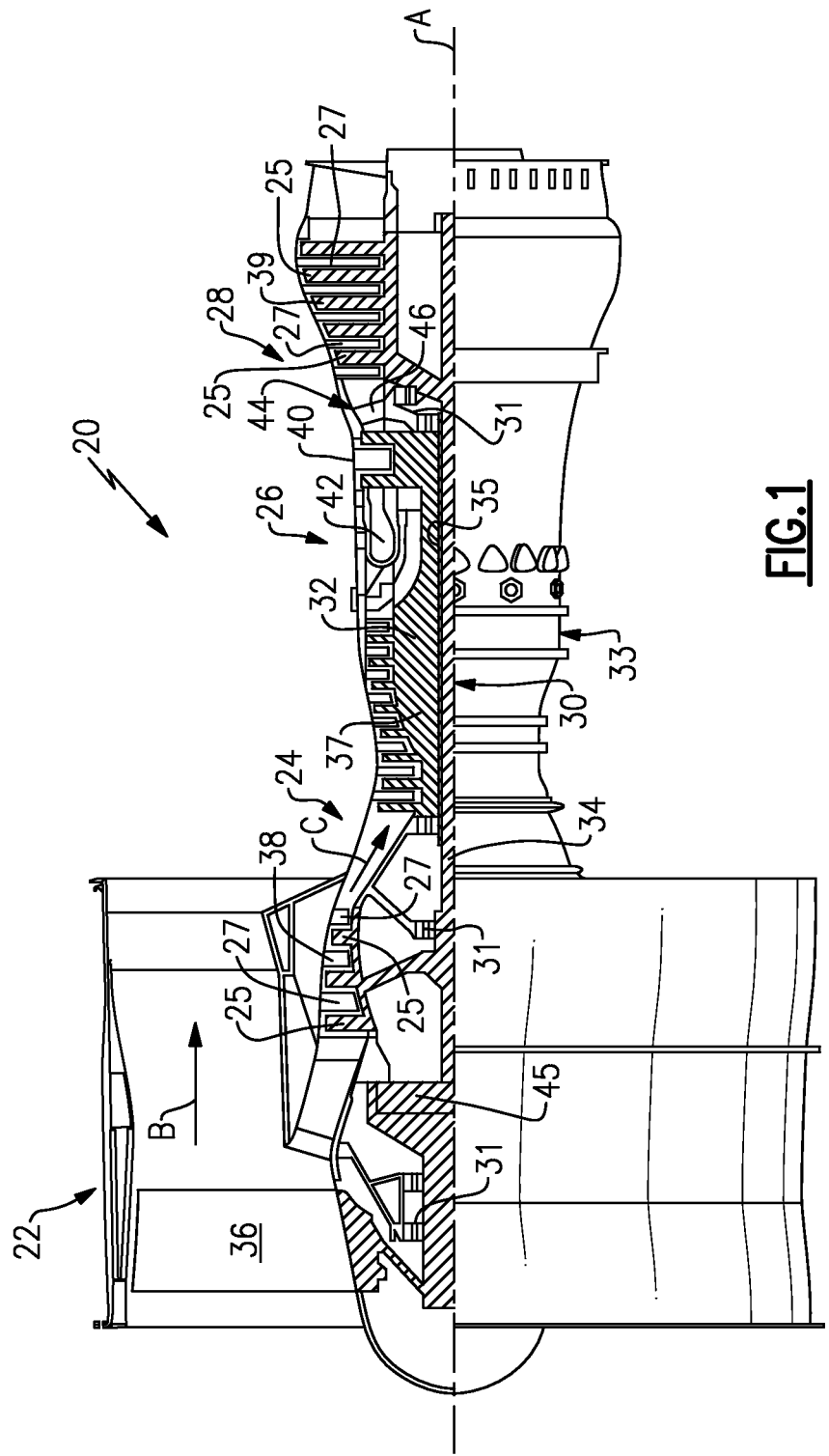
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems or features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in this non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[T_{ram}° R/(518.7° R)]^{0.5}$. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 create or extract energy (in the form of pressure) from the core airflow that is communicated through the gas turbine engine 20 along the core flow path C. The vanes 27 direct the core airflow to the blades 25 to either add or extract energy.

Various components of the gas turbine engine 20, including but not limited to the airfoil and platform sections of the blades 25 and vanes 27 of the compressor section 24 and the turbine section 28, may be subjected to repetitive thermal cycling under widely ranging temperatures and pressures. The hardware of the turbine section 20 is particularly subjected to relatively extreme operating conditions. Therefore, some components may require dedicated internal cooling circuits to cool the parts during engine operation. This disclosure relates to gas turbine engine components having cooling configurations capable of providing prioritized cooling at specific locations of a component, as is further discussed below.

Figure 2:
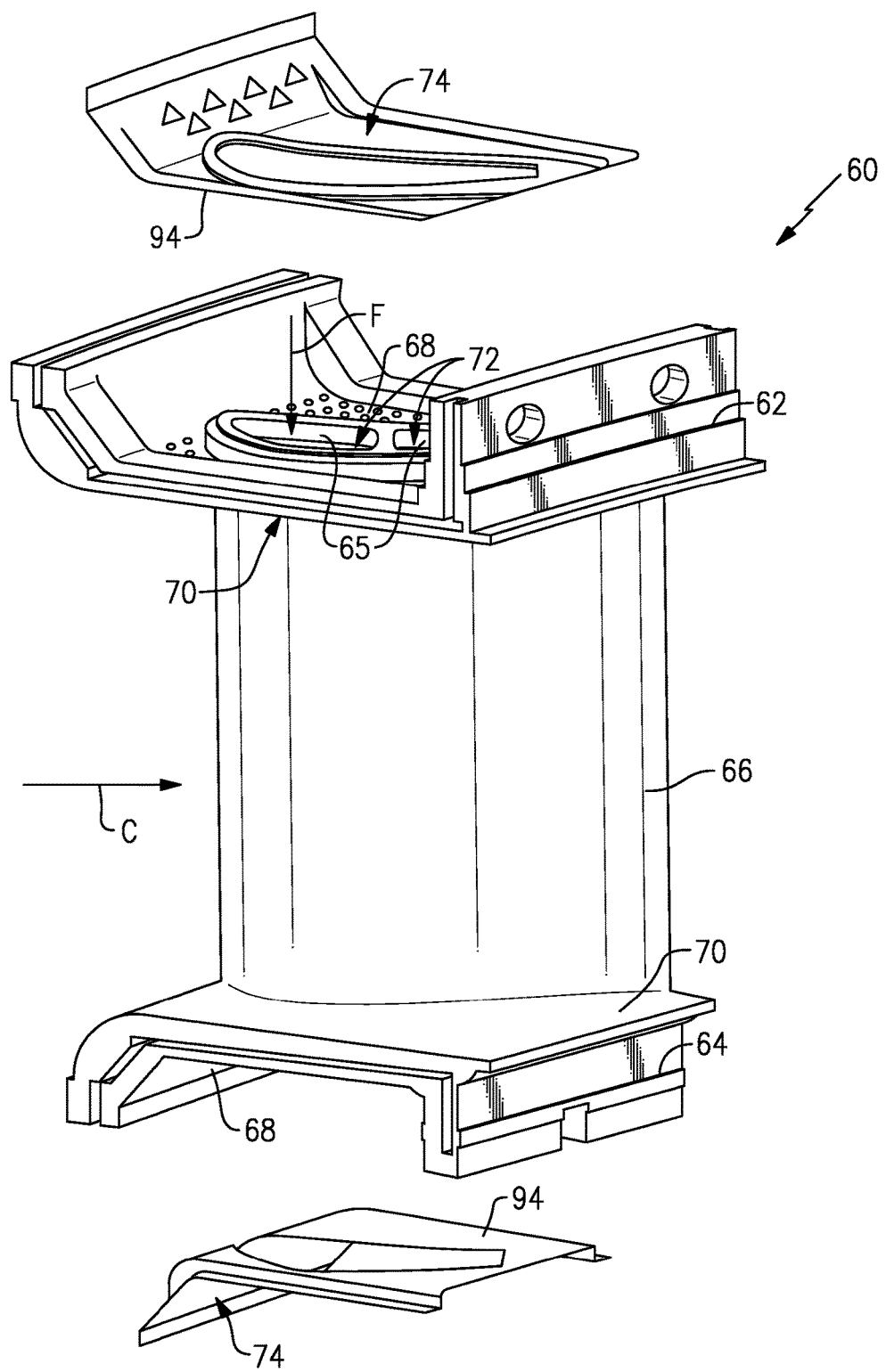
FIG. 2 illustrates a component that can be incorporated into a gas turbine engine.

FIG. 2 illustrates a component 60 that can be incorporated into a gas turbine engine, such as the gas turbine engine 20 of FIG. 1. In this non-limiting embodiment, the component 60 is represented as a turbine vane. However, the teachings of this disclosure are not limited to turbine vanes and could extend to other components of a gas turbine engine, including but not limited to, compressor vanes, blade outer air seals (BOAS) (see, for example, the BOAS illustrated in FIG. 6), or any other static hardware.

In one embodiment, the component 60 includes an outer platform 62, an inner platform 64, and an airfoil 66 that extends between the outer platform 62 and the inner platform 64. The outer platform 62 connects the component 60 to an engine casing (not shown), and the inner platform 64 affixes a radially inboard portion of the component 60 to securely position the component 60 within the core flow path C.

The outer platform 62 and the inner platform 64 each include a non-gas path surface 68 and a gas path surface 70. In other words, when mounted in a gas turbine engine, the non-gas path surfaces 68 are positioned on a non-core flow path side of the component 60 (i.e., remotely from the hot combustion gases of the core flow path C). The gas path surfaces 70 establish the radially inner and outer flow boundaries of the core flow path C.

The component 60 may additionally include one or more internal cores 72. The internal cores 72 are hollow passages formed inside of the component 60 that channel a cooling fluid F (e.g., a bleed airflow from the compressor section 24) to remove heat from the component 60 in a heat transfer process. The internal cores 72 may extend through the airfoil 66 to cool the airfoil 66. In one embodiment, as best shown with respect to the outer platform 62, the internal cores 72 may jut outwardly from the outer platform 62 and the inner platform 64 to define openings 65 for receiving the cooling fluid F.

The outer platform 62 and the inner platform 64 may additionally require dedicated cooling. Accordingly, a cover plate 74 may be positioned relative to each of the outer platform 62 and the inner platform 64. The cover plate 74 may be a separate component form the outer and inner platforms 62, 64 or could be cast integrally with each of the outer and inner platforms 62, 64.

In one embodiment, the cover plates 74 are positioned relative to the non-gas path surfaces 68 of the outer and inner platforms 62, 64. Once positioned relative to the non-gas path surface 68, the cover plates 74 establish a platform cooling passage (see, for example, platform cooling passage 86 of FIG. 4) that extends between an interior surface 94 of the cover plate 74 and the non-gas path surface 68. The cooling fluid F may be communicated through the cover plate 74 and into a platform cooling passage to cool portions of the outer and inner platforms 62, 64. In one embodiment, as discussed in greater detail below, the component 60 may prioritize cooling at preferred locations (i.e., relatively high temperature surfaces) of the component 60 prior to cooling less preferred locations (i.e., relatively low temperature surfaces) of the component 60.

Figure 3:
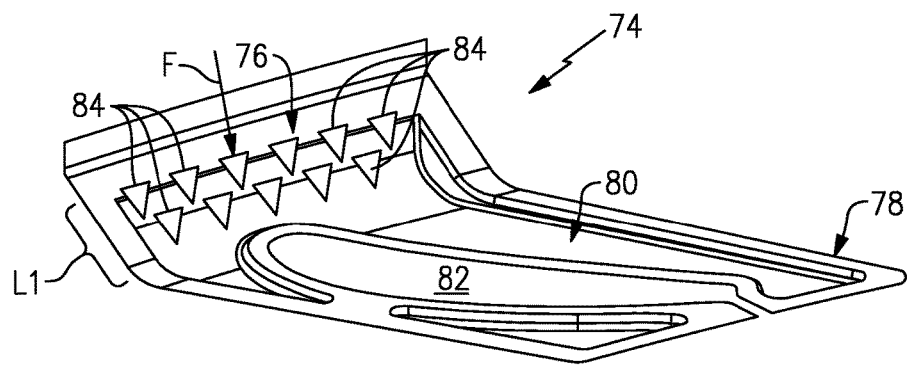
FIG. 3 illustrates a cover plate of a gas turbine engine component.
Figure 4:
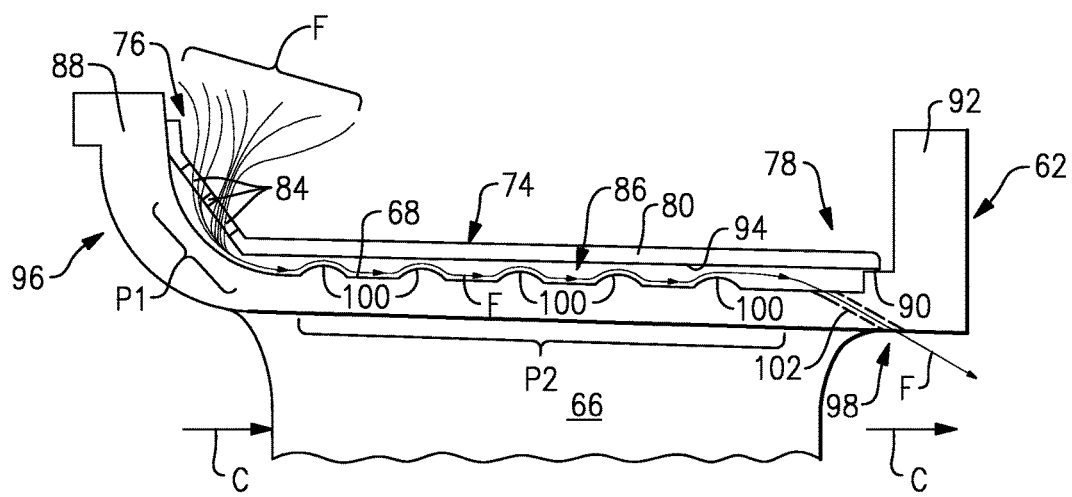
FIG. 4 schematically illustrates a method of cooling a gas turbine engine component.

FIGS. 3 and 4 illustrate an exemplary cover plate 74 that can be utilized to establish a platform cooling passage 86 associated with a platform 62 (shown in FIG. 4). In this disclosure, the term "platform" is intended to include any portion of a component that has a surface that is exposed to the core flow path C of a gas turbine engine and therefore may require dedicated cooling. For example, the platform 62 could be part of a vane (see FIGS. 2 and 4), a BOAS (see FIG. 6), or other static hardware within the scope of this disclosure.

In one embodiment, the cover plate 74 includes a leading edge 76, a trailing edge 78 and a main body 80 that extends between the leading edge 76 and the trailing edge 78. An opening 82 may be formed in the main body 80 for accommodating an opening in a platform, such as the opening 65 of an internal core 72 (see FIG. 2).

In one embodiment, the leading edge 76 is angled relative to the main body 80. In other words, in a non-limiting embodiment, the leading edge 76 is elevated relative to the main body 80. However, the cover plate 74 can be configured to accommodate the size and shape of any platform of any gas turbine engine component.

The cover plate 74 may additionally include one or more cooling entrances 84 for directing cooling fluid F into the platform cooling passage 86. In one embodiment, the cooling entrances 84 are triangular shaped and are arranged in multiple rows. However, the cooling entrances 84 may include any shape and may be configured in any pattern. In one embodiment, the cooling entrances 84 are configured to alter a flow characteristic of the cooling fluid F. For example, the cooling entrances 84 may impart a swirling motion to the cooling fluid F, thereby increasing its cooling effectiveness.

In one non-limiting embodiment, a plurality of cooling entrances 84 are disposed exclusively at a first location L1 of the cover plate 74. The first location L1 may be near the leading edge 76 of the cover plate 74. However, other locations are also contemplated depending on the cooling requirements of the component 60. The remainder of the cover plate 74, including the main body 80 and the trailing edge 78, completely excludes any cooling openings for directing the cooling fluid F into the platform cooling passage 86. In this way, the cooling fluid F that is directed through the cooling entrances 84 is communicated directly to a prioritized location P1, such as the hottest locations of the platform 62 that are most susceptible to thermal distresses, prior to being used to cool other, non-prioritized locations P2 of the platform 62 that are generally located at relatively cooler locations of the platform 62.

Referring to FIG. 4, the cover plate 74 is positioned relative to the non-gas path surface 68 of the platform 62 to establish the platform cooling passage 86. Although illustrated as an outer platform, the platform 62 could include an inner platform or any other section of a component. The cover plate 74 may be positioned such that a portion of the leading edge 76 rests against a rail 88 of the platform 62 and a portion of the trailing edge 78 rests against a land 90 that extends from the non-gas path surface 68 to another rail 92. The main body 80 of the cover plate 74 is spaced from the non-gas path surface 68 to define the platform cooling passage 86 between an interior surface 94 of the cover plate 74 and the non-gas path surface 68.

In one non-limiting embodiment, the non-gas path surface 68 of the platform 62 of the component 60 may be cooled by communicating cooling fluid F through the plurality of cooling entrances 84 formed in the cover plate 74. The cooling fluid F is first directed to the prioritized location P1 of the platform 62. This can be accomplished by locating the cooling entrances 84 exclusively in the vicinity of the prioritized location P1. In one non-limiting embodiment, the prioritized location P1 is at a leading edge 96 of the platform 62 and the cooling entrances 84 are therefore disposed at the leading edge 76 of the cover plate 74. The cooling fluid F may at least partially impinge upon the prioritized location P1.

After first cooling the prioritized location P1, the cooling fluid F can be communicated to cool the non-prioritized locations P2 of the platform 62. In this case, the cooling fluid F is axially circulated toward a trailing edge 98 of the platform 62 in order to convectively cool the non-prioritized locations P2 of the non-gas path surface 68. One or more augmentation features 100 may be protrude from the non-gas path surface 68 within the platform cooling passage 86 in order to increase the effective heat transfer between the cooling fluid F and the platform 62. Suitable augmentation features include but are not limited to domes, trip strips, pins or fins.

Figure 5:
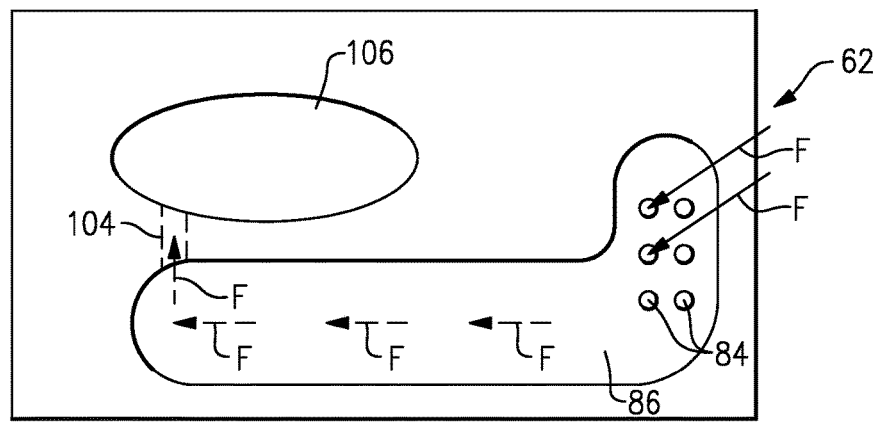
FIG. 5 schematically illustrates another method of cooling a gas turbine engine component.

Finally, the cooling fluid F may be expelled from the platform cooling passage 86. In one embodiment, the cooling fluid F is expelled through one or more film cooling holes 102 and is returned to the core flow path C. Alternatively, as shown in FIG. 5, the cooling fluid F may be expelled through an opening 104 into an adjacent cooling passage 106 in order to cool other surfaces of the platform 62.

Figure 6:
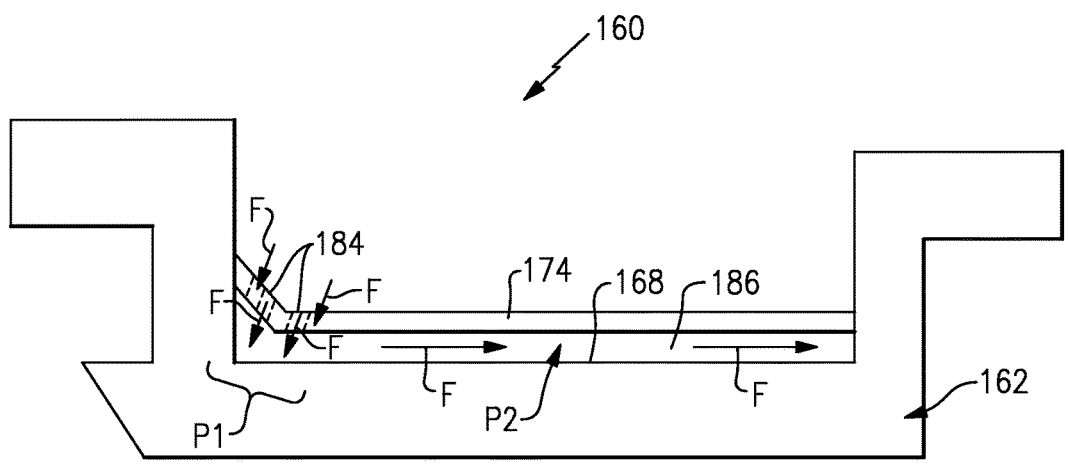
FIG. 6 illustrates another gas turbine engine component.

FIG. 6 illustrates another component 160 that can be incorporated into a gas turbine engine. In this embodiment, the component 160 is represented as a BOAS. The component 160 includes a platform 162 and a cover plate 174 that can be positioned relative to a non-gas path surface 168 of the platform 162 to define a platform cooling passage 186. Similar to the component 60, the cover plate 174 may include a plurality of cooling entrances 184 that are configured to bias a flow of a cooling fluid F toward a prioritized location P1 of the platform 162 prior to directing the cooling fluid F toward the non-prioritized locations P2 of the platform 162.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A component for a gas turbine engine, comprising:
a platform having a non-gas path surface and a gas path surface;
a cover plate positioned relative to said non-gas path surface;
a cooling passage that extends between said cover plate and said non-gas path surface;
at least one cooling entrance formed through said cover plate and configured to bias the flow of a cooling fluid toward a prioritized location of said non-gas path surface;
wherein said cover plate includes a leading edge, a trailing edge and a main body that extends between said leading edge and said trailing edge, said leading edge is angled and elevated relative to said main body, and said at least one cooling entrance includes a plurality of cooling entrances defined exclusively in said leading edge of said cover plate, and said cover plate excludes cooling openings outside of said leading edge of said cover plate; and
an airfoil extending form said gas path side of said platform.

2. The component as recited in claim 1, wherein said platform is an outer diameter platform or an inner diameter platform.

3. The component as recited in claim 1, wherein said cover plate is a separate component from said platform.

4. The component as recited in claim 1, wherein the component is static hardware of the gas turbine engine.

5. The component as recited in claim 1, wherein said cover plate is received at least partially about an opening of an internal core of said airfoil.

6. The component as recited in claim 1, wherein said plurality of cooling entrances are triangular shaped.

7. The component as recited in claim 1, wherein said prioritized location is at a leading edge of said platform.

8. A gas turbine engine, comprising:
a compressor section;
a turbine section downstream from said compressor section;
a component positioned within at least one of said compressor section and said turbine section, said component including:
a platform having a non-gas path surface and a gas path surface;
a cover plate positioned adjacent to said non-gas path surface;
a cooling passage extending between said cover plate and said non-gas path surface;
a plurality of cooling entrances positioned exclusively at a first location of said cover plate, wherein said cover plate excludes cooling openings outside of said first location; and
wherein said cover plate includes a leading edge, a trailing edge and a main body that extends between said leading edge and said trailing edge, said leading edge is angled and elevated relative to said main body, and said first location is said leading edge.

9. The gas turbine engine as recited in claim 8, wherein said component is a vane.

10. The gas turbine engine as recited in claim 8, wherein said component is a blade outer air seal (BOAS).

11. The gas turbine engine as recited in claim 8, wherein said plurality of cooling entrances are configured to bias the flow of a cooling fluid toward a prioritized location of said non-gas path surface.

12. The gas turbine engine as recited in claim 8, comprising at least one opening configured to expel a cooling fluid from said cooling passage to either a core flow path of the gas turbine engine or a second cooling passage.

13. The gas turbine engine as recited in claim 8, further comprising:
a plurality of augmentation features protruding from said non-gas path surface within said cooling passage;

wherein said component is a vane including an airfoil extending from said platform;
wherein said cover plate is a separate component from said platform; and
wherein said cover plate is received about an opening of an internal core of said airfoil.

14. A method of cooling a component of a gas turbine engine, comprising the steps of:
communicating a cooling fluid through at least one cooling entrance of a cover plate and into a first cooling passage;
wherein said cover plate includes a leading edge, a trailing edge and a main body that extends between said leading edge and said trailing edge, said leading edge is angled and elevated relative to said main body, and said at least one cooling entrance is disposed at said leading edge;
cooling a prioritized location of a platform with the cooling fluid;
after the step of cooling, communicating the cooling fluid to a non-prioritized location of the platform;
expelling the cooling fluid from the cooling passage; and
wherein said at least one cooling entrance includes a plurality of cooling entrances defined exclusively in said leading edge of said cover plate, and said cover plate excludes cooling openings outside of said leading edge of said cover plate.

15. The method as recited in claim 14, wherein the step of communicating the cooling fluid through the at least one cooling entrance includes altering a flow characteristic of the cooling fluid.

16. The method as recited in claim 14, wherein the step of communicating the cooling fluid to the non-prioritized location includes circulating the cooling fluid to convectively cool the non-prioritized location.

17. The method as recited in claim 14, wherein the step of expelling includes communicating the cooling fluid to a core flow path of the gas turbine engine.

18. The method as recited in claim 14, wherein the step of expelling includes communicating the cooling fluid to a second cooling passage.

* * * * *